United States Patent
Okabe et al.

(10) Patent No.: US 12,190,027 B2
(45) Date of Patent: Jan. 7, 2025

(54) DEVELOPMENT SUPPORT DEVICE, TERMINAL DEVICE, DEVELOPMENT SUPPORT METHOD, AND COMPUTER PROGRAM

(71) Applicant: GS Yuasa International Ltd., Kyoto (JP)

(72) Inventors: Yosuke Okabe, Kyoto (JP); Shigeki Yamate, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 912 days.

(21) Appl. No.: 17/265,435

(22) PCT Filed: Aug. 27, 2019

(86) PCT No.: PCT/JP2019/033510
§ 371 (c)(1),
(2) Date: Feb. 2, 2021

(87) PCT Pub. No.: WO2020/045425
PCT Pub. Date: Mar. 5, 2020

(65) Prior Publication Data
US 2021/0357551 A1 Nov. 18, 2021

(30) Foreign Application Priority Data

Aug. 31, 2018 (JP) .................. 2018-163516
Aug. 31, 2018 (JP) .................. 2018-163517

(51) Int. Cl.
*G06F 30/20* (2020.01)
*G06F 111/10* (2020.01)
*G06F 119/06* (2020.01)

(52) U.S. Cl.
CPC .......... *G06F 30/20* (2020.01); *G06F 2111/10* (2020.01); *G06F 2119/06* (2020.01)

(58) Field of Classification Search
CPC ........ G06F 30/20; G06F 30/367; G06F 30/25; G06F 30/27; G06F 30/28; G06F 30/23; G06F 2111/00–2119/22; H02J 2203/20
See application file for complete search history.

(56) References Cited

U.S. PATENT DOCUMENTS

2006/0155760 A1   7/2006   Takahashi et al.
2014/0067297 A1   3/2014   Prada et al.
(Continued)

FOREIGN PATENT DOCUMENTS

CN   106055775 A   * 10/2016   ......... G06F 17/5036
JP   11-14507 A   1/1999
(Continued)

OTHER PUBLICATIONS

G. B. Less et al "Micro-Scale Modeling of Li-Ion Batteries: Parameterization and Validation" J. Electrochem. Soc. 159 A697 (Year: 2012).*

(Continued)

*Primary Examiner* — Rehana Perveen
*Assistant Examiner* — Troy A Maust
(74) *Attorney, Agent, or Firm* — RANKIN, HILL & CLARK LLP

(57) ABSTRACT

A development support device, a terminal device, a development support method, and a computer program are provided. A receiving unit that receives a simulation condition of a power storage device from a terminal device after user authentication of the terminal device, a simulation execution unit that simulates behavior of the power storage device based on the received simulation condition, and a transmission unit that transmits a simulation result by the simulation execution unit to the terminal device are included.

12 Claims, 8 Drawing Sheets

(56) References Cited

U.S. PATENT DOCUMENTS

| | | | |
|---|---|---|---|
| 2014/0288912 A1* | 9/2014 | Inoue | H04L 67/12 703/14 |
| 2017/0308623 A1 | 10/2017 | Cox et al. | |

FOREIGN PATENT DOCUMENTS

| | | | |
|---|---|---|---|
| JP | 2002-215963 A | 8/2002 | |
| JP | 2002-304433 A | 10/2002 | |
| JP | 2002-328961 A | 11/2002 | |
| JP | 2004-152161 A | 5/2004 | |
| JP | 2004-220600 A | 8/2004 | |
| JP | 2011-18357 A | 1/2011 | |
| JP | 2014-182734 A | 9/2014 | |
| JP | 2014-522548 A | 9/2014 | |
| JP | 2015-50062 A | 3/2015 | |
| JP | 2016-152208 A | 8/2016 | |
| JP | 2017-139857 A | 8/2017 | |
| JP | 2017-208033 A | 11/2017 | |
| JP | 2017-208081 A | 11/2017 | |
| WO | WO-2013075909 A1 * | 5/2013 | ......... G06F 17/5009 |

OTHER PUBLICATIONS

Rutooj Deshpande et al "Battery Cycle Life Prediction with Coupled Chemical Degradation and Fatigue Mechanics" 2012 J. Electrochem. Soc. 159 A1730 (Year: 2012).*

Ju et al. "Virtual Battery: A Battery Simulation Framework for Electric Vehicles", IEEE Transactions on Automation Science and Engineering, vol. 10, No. 1, Jan. 2013 (Year: 2013).*

Kim et al. "Dependable, Efficient, Scalable Architecture for Management of Large-scale Batteries" (Year: 2010).*

Choi et al. "Load and Source Battery Simulator Based on Z-Source Rectifier" IEEE Transactions on Power Electronics, vol. 32, No. 8, Aug. 2017 (Year: 2017).*

International Search Report (ISR) dated Nov. 12, 2019 filed in PCT/JP2019/033510.

* cited by examiner

Fig. 3

| Battery ID | User ID | Positive electrode | | | | | | Negative electrode | | | | |
|---|---|---|---|---|---|---|---|---|---|---|---|---|
| | | Active material | Thickness | Width | Depth | OCP | Active material | Thickness | Width | Depth | OCP | |
| c001 | u001 | LMO | Zp | Xp | Yp | ☑ | Graphite | Zn | Xn | Yn | ☑ | |
| .... | .... | .... | .... | .... | .... | .... | .... | .... | .... | .... | .... | .... |

DEVELOPMENT SUPPORT DEVICE, TERMINAL DEVICE, DEVELOPMENT SUPPORT METHOD, AND COMPUTER PROGRAM

TECHNICAL FIELD

The present invention relates to a development support device, a terminal device, a development support method, and a computer program.

BACKGROUND ART

In recent years, model-based development (MBD) has been actively introduced in various industries including the automobile industry, and product development based on simulation has become widespread (see, for example, Patent Document 1).

PRIOR ART DOCUMENT

Patent Document

Patent Document 1: JP-A-11-14507

SUMMARY OF THE INVENTION

Problems to be Solved by the Invention

In model-based development, for example, in a case of simulating the behavior of a specific power storage device which is one element in the development, it is necessary to set a mathematical model corresponding to the power storage device. Since a general formula (calculation model) for describing the behavior of the power storage device is publicly known, each user can arbitrarily acquire and use the general formula. However, in such a calculation model, parameters corresponding to the characteristics and operation conditions of the power storage device are not set. Thus, even if a calculation model is obtained, a simulation result according to the characteristics and operation conditions of the power storage device cannot be acquired.

An object of the present invention is to provide a development support device, a terminal device, a development support method, and a computer program capable of providing, via a network, the user with a simulation result of the behavior of a power storage device executed under conditions desired by the user.

Means for Solving the Problems

A development support device includes a receiving unit that receives a simulation condition of a power storage device from a terminal device after user authentication of the terminal device, a simulation execution unit that simulates behavior of the power storage device based on the received simulation condition, and a transmission unit that transmits a simulation result by the simulation execution unit to the terminal device.

A development support device includes a receiving unit that presents a plurality of simulation options and receives a simulation condition of a power storage device for a selected simulation option from a terminal device, a simulation execution unit that simulates the behavior of the power storage device based on the received simulation condition, and a transmission unit that transmits a simulation result by the simulation execution unit to the terminal device.

A terminal device includes a display unit that displays a receiving screen that receives a simulation condition for simulating behavior of a power storage device, an accepting unit that receives a simulation condition through the receiving screen, a transmission unit that transmits the received simulation condition to a development support device that simulates the behavior, and a receiving unit that receives a simulation result of the behavior based on the simulation condition from the development support device. The received simulation result is displayed on the display unit.

A development support method uses a development support device communicably connected to a terminal device to receive a simulation condition of a power storage device from a terminal device after user authentication of the terminal device, simulate behavior of the power storage device based on the received simulation condition, and transmit a simulation result to the terminal device.

A development support method uses a development support device communicably connected to a terminal device to present a plurality of simulation options and receive a simulation condition of a power storage device for a selected simulation option from a terminal device, simulate behavior of the power storage device based on the received simulation condition, and transmit a simulation result to the terminal device.

A development support method uses a terminal device communicably connected to a development support device that simulates behavior of a power storage device to display a receiving screen that receives a simulation condition and receiving a simulation condition on a displayed receiving screen, transmit the simulation condition received on the receiving screen to the development support device, receive a simulation result of the behavior based on the simulation condition from the development support device, and display the received simulation result on a display screen.

A computer program causes a computer to execute processing of receiving a simulation condition of a power storage device from a terminal device after user authentication of the terminal device, simulating behavior of the power storage device based on the received simulation condition, and transmitting a simulation result to the terminal device.

A computer program causes a computer to execute processing of presenting a plurality of simulation options and receiving a simulation condition of a power storage device for a selected simulation option from a terminal device, simulating behavior of the power storage device based on the received simulation condition, and transmitting a simulation result to the terminal device.

A computer program causes a computer communicably connected to a development support device that simulates behavior of a power storage device to execute processing of displaying a receiving screen that receives a simulation condition and receiving a simulation condition on a displayed receiving screen, transmitting the simulation condition received on the receiving screen to the development support device, receiving a simulation result of the behavior based on the simulation condition from the development support device, and displaying the received simulation result on a display screen.

A computer program causes a computer to execute processing of receiving, on a receiving screen, drawing of a characteristic curve showing physical property of a power storage device or a load fluctuation curve showing a change over time of an operating state of the power storage device, and reading a numerical value from the characteristic curve or the load fluctuation curve drawn on the receiving screen to acquire information related to the physical property or the operating state.

Advantages of the Invention

According to the above configuration, it is possible to provide, via the network, the user with a simulation result of the behavior of a power storage device executed under conditions desired by the user.

BRIEF DESCRIPTION OF THE DRAWINGS

FIG. 3 is a conceptual diagram illustrating an example of a battery table.

MODE FOR CARRYING OUT THE INVENTION

Figure 1:
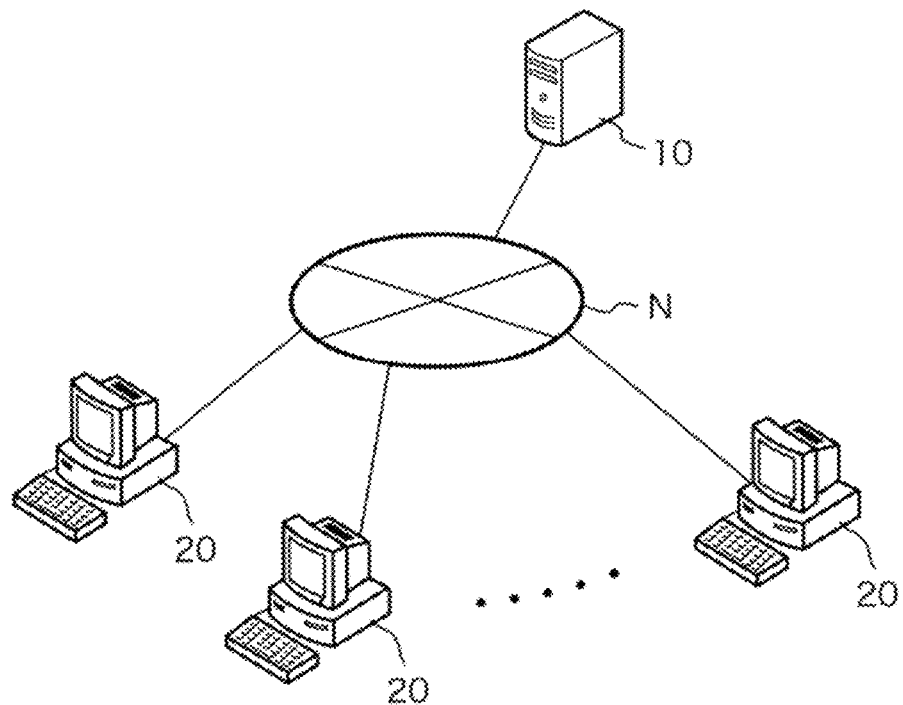
FIG. 1 is a block diagram explaining an overall configuration of a simulation system.

Conventionally, a general formula (calculation model) for describing the behavior of a power storage device is publicly known, each user can arbitrarily acquire and use a general formula. However, the calculation model does not include a parameter corresponding to the characteristics of a specific power storage device. Thus, even if such a calculation model is used, the behavior of the power storage device cannot be simulated. In order to predict the behavior of a power storage device, a mathematical model including parameters corresponding to the characteristics and operation conditions of the power storage device is required. However, it is difficult for each user to acquire such a mathematical model. Therefore, conventionally, it is difficult to arbitrarily acquire a simulation result for the behavior of a power storage device under conditions desired by the user.

Conversely, the development support device includes a receiving unit that receives a simulation condition of a power storage device from a terminal device after user authentication of the terminal device, a simulation execution unit that simulates the behavior of the power storage device based on the received simulation condition, and a transmission unit that transmits a simulation result by the simulation execution unit to the terminal device.

Therefore, even in a case where the user is not familiar with the theory expressing the behavior of the power storage device, the development support device can provide the user with a simulation result including a mathematical model only by receiving a simulation condition. Further, the development support device can distinguish between the user having appropriate specialized knowledge and the user who does not have specialized knowledge by user authentication, and can provide a simulation result only to the user who has specialized knowledge.

A development support device includes a receiving unit that presents a plurality of simulation options and receives a simulation condition of a power storage device for a selected simulation option from a terminal device, a simulation execution unit that simulates the behavior of the power storage device based on the received simulation condition, and a transmission unit that transmits a simulation result by the simulation execution unit to the terminal device.

Therefore, even in a case where the user is not familiar with the theory expressing the behavior of the power storage device, the development support device can provide the user with a simulation result including a mathematical model only by receiving a simulation option desired by the user among the presented simulation options.

The configuration may be such that a storage unit that stores a simulation program that simulates behavior of the power storage device is included, and the simulation execution unit simulates behavior of the power storage device based on the simulation program. According to this configuration, since a simulation program representing the behavior of the power storage device is prepared in the development support device, it is possible to provide the user with a desired simulation result including a mathematical model simply by receiving a simulation condition.

The configuration may be such that a plurality of simulation programs corresponding to a plurality of types of behavior of the power storage device are stored in the storage unit, and the simulation execution unit simulates behavior to be simulated selected by the terminal device by using a simulation program corresponding to the behavior. According to this configuration, a desired simulation result can be provided to the user by accepting the information on the behavior to be simulated selected by the user and the simulation conditions.

The simulation result transmitted from the transmission unit may include a mathematical model obtained as a result of the simulation of the behavior. According to this configuration, a mathematical model can be provided to the user. Further, the user can acquire a simulation result with various input conditions on the user terminal by using a mathematical model downloaded from the development support device.

The transmission unit may transmit the mathematical model to the terminal device in a format designated by the terminal device. According to this configuration, a mathematical model can be provided in a format compatible with a programming language or numerical analysis software installed in the terminal device.

The mathematical model may include an execution code executed by a programming language or numerical analysis software, or definition information or a library file referred to by the programming language or the numerical analysis software. The execution code may be in a form of an executable binary file, an interpreter file, or a source code. According to this configuration, it is possible to provide the user with an execution code, definition information, or a library file that can be used in a programming language or numerical analysis software installed in the terminal device.

The simulation condition may include at least one of a circuit configuration, physical property, and an operating state of the power storage device. According to this configuration, it is possible to execute a simulation related to the behavior of the power storage device by designating a circuit configuration, the physical property, or an operating state of the power storage device.

Behavior simulated by the simulation execution unit may include a change in terminal voltage accompanied by charge and discharge of the power storage device, a change in capacity accompanied by charge and discharge of the power storage device, a change over time in capacity of the power storage device, or temperature distribution in the power storage device. According to this configuration, it is possible to provide the user with a simulation result including a mathematical model for a change in terminal voltage accompanied by charge and discharge of the power storage device, a change in capacity accompanied by charge and discharge of the power storage device, a change over time in capacity of the power storage device, or temperature distribution in the power storage device, for which it is difficult for the user to individually build a mathematical model.

The receiving unit may receive, from the terminal device, a simulation condition input by drawing of a circuit configuration of the power storage device, a characteristic curve representing physical property of the power storage device, or a load fluctuation curve representing a change over time in an operating state of the power storage device. According to this configuration, it is possible to receive a simulation condition input through simple operation such as drawing a circuit configuration or drawing a curve, and provide the user with a simulation result including a mathematical model based on the simulation condition.

The receiving unit may receive user identification information together with a simulation condition, and the storage unit may store the received simulation condition and user identification information in association with each other. According to this configuration, a simulation condition can be stored in the storage unit in association with user identification information, so that the simulation condition can be read from the storage unit as needed and the simulation can be executed based on the read simulation condition.

A terminal device includes a display unit that displays a receiving screen that receives a simulation condition for simulating behavior of a power storage device, an accepting unit that receives a simulation condition through the receiving screen, a transmission unit that transmits the received simulation condition to a development support device that simulates the behavior, and a receiving unit that receives a simulation result of the behavior based on the simulation condition from the development support device. The received simulation result is displayed on the display unit. According to this configuration, the user can acquire a desired simulation result including a mathematical model by relatively simple operation such as inputting a simulation condition even if the user is not familiar with a theory expressing the behavior of the power storage device.

A development support method uses a development support device communicably connected to a terminal device to receive a simulation condition of a power storage device from a terminal device after user authentication of the terminal device, simulate behavior of the power storage device based on the received simulation condition, and transmit a simulation result to the terminal device. According to this configuration, a desired simulation result including a mathematical model can be provided to the user simply by receiving a simulation condition.

A development support method uses a development support device communicably connected to a terminal device to present a plurality of simulation options and receive a simulation condition of a power storage device for a selected simulation option from a terminal device, simulate behavior of the power storage device based on the received simulation condition, and transmit a simulation result to the terminal device. According to this configuration, a desired simulation result including a mathematical model can be provided to the user simply by receiving a simulation option.

A development support method uses a terminal device communicably connected to a development support device that simulates behavior of a power storage device to display a receiving screen that receives a simulation condition and receiving a simulation condition on a displayed receiving screen, transmit the simulation condition received on the receiving screen to the development support device, receive a simulation result of the behavior based on the simulation condition from the development support device, and display the received simulation result on a display screen. According to this configuration, the user can acquire a desired simulation result including a mathematical model by relatively simple operation such as inputting a simulation condition even if the user is not familiar with a theory expressing the behavior of the power storage device.

A computer program causes a computer to execute processing of receiving a simulation condition of a power storage device from a terminal device after user authentication of the terminal device, simulating behavior of the power storage device based on the received simulation condition, and transmitting a simulation result to the terminal device. According to this configuration, a desired simulation result including a mathematical model can be provided to the user simply by receiving a simulation condition.

A computer program causes a computer to execute processing of presenting a plurality of simulation options and receiving a simulation condition of a power storage device for a selected simulation option from a terminal device, simulating behavior of the power storage device based on the received simulation condition, and transmitting a simulation result to the terminal device. According to this configuration, a desired simulation result including a mathematical model can be provided to the user simply by receiving a simulation option.

A computer program causes a computer communicably connected to a development support device that simulates behavior of a power storage device to execute processing of displaying a receiving screen that receives a simulation condition and receiving a simulation condition on a displayed receiving screen, transmitting the simulation condition received on the receiving screen to the development support device, receiving a simulation result of the behavior based on the simulation condition from the development support device, and displaying the received simulation result on a display screen.

Therefore, the user can acquire a desired simulation result including a mathematical model by relatively simple operation such as inputting a simulation condition even if the user is not familiar with a theory expressing the behavior of the power storage device.

The simulation condition may include at least one of a circuit configuration, physical property, and an operating state of the power storage device. According to this configuration, it is possible to execute a simulation related to the behavior of the power storage device by designating a circuit configuration, the physical property, or an operating state of the power storage device.

The computer may be caused to execute processing of receiving drawing of the circuit configuration on the receiving screen and acquiring information related to a circuit configuration of the power storage device from the circuit configuration drawn on the receiving screen. According to this configuration, since the information related to a circuit configuration is input by drawing of the circuit configuration on the screen, the burden of inputting information by the user can be reduced.

The computer may be caused to execute processing of receiving, on the receiving screen, drawing regarding the arrangement of energy storage devices constituting the power storage device and a connection relationship between the energy storage devices. According to this configuration, information related to a circuit configuration is graphically input by drawing on the screen the arrangement of energy storage devices constituting a power storage device and a connection relationship between the energy storage devices, so that the burden of inputting information by the user can be reduced.

The computer may be caused to execute processing of receiving, on the receiving screen, designation of a short circuit location in the power storage device. According to this configuration, a short circuit location in the power storage device can be designated, and a simulation can be executed for a heat generation amount of the power storage device accompanied by a short circuit.

The computer may be caused to execute processing of receiving, on the receiving screen, drawing of a characteristic curve showing physical property of the power storage device or a load fluctuation curve showing a change over time of an operating state of the power storage device, and reading a numerical value from the characteristic curve or the load fluctuation curve drawn on the receiving screen to acquire information related to the physical property or the operating state. According to this configuration, since drawing of a characteristic curve or a load fluctuation curve related to the power storage device is received, the burden of inputting information by the user can be reduced as compared with the case where a numerical value is directly input.

The computer may be caused to execute processing of storing the received simulation condition in a storage device and reading a simulation condition to be transmitted to the development support device from the storage device. According to this configuration, since a simulation condition input in the past can be used, it is possible to reduce the burden of inputting information by the user in cases such as that the behavior of a plurality of power storage devices is checked under the same condition.

Behavior of the power storage device simulated by the development support device may include a change in terminal voltage accompanied by charge and discharge of the power storage device, a change in capacity accompanied by charge and discharge of the power storage device, a change over time in capacity of the power storage device, or temperature distribution in the power storage device. According to this configuration, a simulation can be executed for a change in terminal voltage accompanied by charge and discharge of the power storage device, a change in capacity accompanied by charge and discharge of the power storage device, a change over time in capacity of the power storage device, temperature distribution in the power storage device, or the like for which it is difficult for the user to individually build a mathematical model.

The simulation result may include numerical data obtained by numerical analysis based on a simulation program corresponding to the behavior to be simulated. According to this configuration, some numerical value indicating the behavior of the power storage device can be directly acquired.

The simulation result may include a mathematical model obtained as a result of the simulation of the behavior. According to this configuration, a mathematical model obtained as a result of the simulation of the power storage device can be downloaded. Further, a simulation with various input conditions can be executed on the user terminal by using the downloaded mathematical model.

The computer may be caused to execute processing of receiving designation of a format for a mathematical model to be received and requesting the development support device to transmit a mathematical model of the designated format. According to this configuration, a mathematical model can be downloaded in a format compatible with a programming language or numerical analysis software installed in the user terminal, and use can be started immediately on the user terminal that downloads the mathematical model.

A computer program causes a computer to execute processing of receiving, on a receiving screen, drawing of a characteristic curve showing physical property of a power storage device or a load fluctuation curve showing a change over time of an operating state of the power storage device, and reading a numerical value from the characteristic curve or the load fluctuation curve drawn on the receiving screen to acquire information related to the physical property or the operating state. According to this configuration, since drawing of a characteristic curve or a load fluctuation curve related to the power storage device is received, the burden of inputting information by the user can be reduced as compared with the case where a numerical value is directly input.

Hereinafter, the present invention will be specifically described with reference to the drawings illustrating an embodiment of the present invention. FIG. 1 is a block diagram explaining an overall configuration of a simulation system. The simulation system according to the present embodiment includes a server device 10 and client device 20, 20, . . . , 20 that are communicably connected to each other via a communication network N. The server device 10 simulates a plurality of types of behavior of a power storage device in response to a request from the client device 20, and provides a simulation result to the client device 20. Here, the power storage device to be simulated includes a rechargeable energy storage device (cell) such as a lead-acid battery or a lithium ion battery which is a secondary battery, and a capacitor which is an electronic component is excluded. In other words, the power storage device to be simulated is an energy storage device that undergoes a dynamic change and a time-series change during charging and discharging, and electronic components such as a capacitor whose charging and discharging are completed only by an electric double layer are excluded. Further, the power storage device to be simulated may include a module in which a plurality of cells are connected in series, a bank in which a plurality of modules are connected in series, a domain in which a plurality of banks are connected in parallel, and the like.

The client device 20 is a terminal device such as a personal computer, a smartphone, a tablet terminal, or the like used by the user. The user may be all users connected via a company intranet regardless of whether they are inside or outside the company, offices of the users, departments the users belong, whereabouts of the users, or the like. It is assumed that software (application program) for accessing the server device 10 is installed in the client device 20. The server device 10 performs user authentication based on, for example, a user ID and a password when receiving an access from the client device 20. In a case where user authentication is successful, the server device 10 provides an appropriate service to the client device 20. The user ID and the password for using the server device 10 do not need to be given to any user, and are only required to be given to the user who has appropriate specialized knowledge of the power storage device.

After user authentication, the server device 10 according to the present embodiment transmits to the client device 20 an interface screen for receiving various inputs by the user of the client device 20. This interface screen includes a selection screen for receiving a selection about the behavior of a simulation target, and a receiving screen for receiving a condition necessary for simulating the selected behavior. Further, the server device 10 transmits the simulation result executed based on the received condition to the client device 20. The simulation result transmitted by the server device 10 to the client device 20 includes data such as numerical data and a graph obtained as an execution result of the simulation. Further, the simulation result transmitted by the server device 10 to the client device 20 may also include a mathematical model obtained as an execution result of the simulation.

Figure 2:
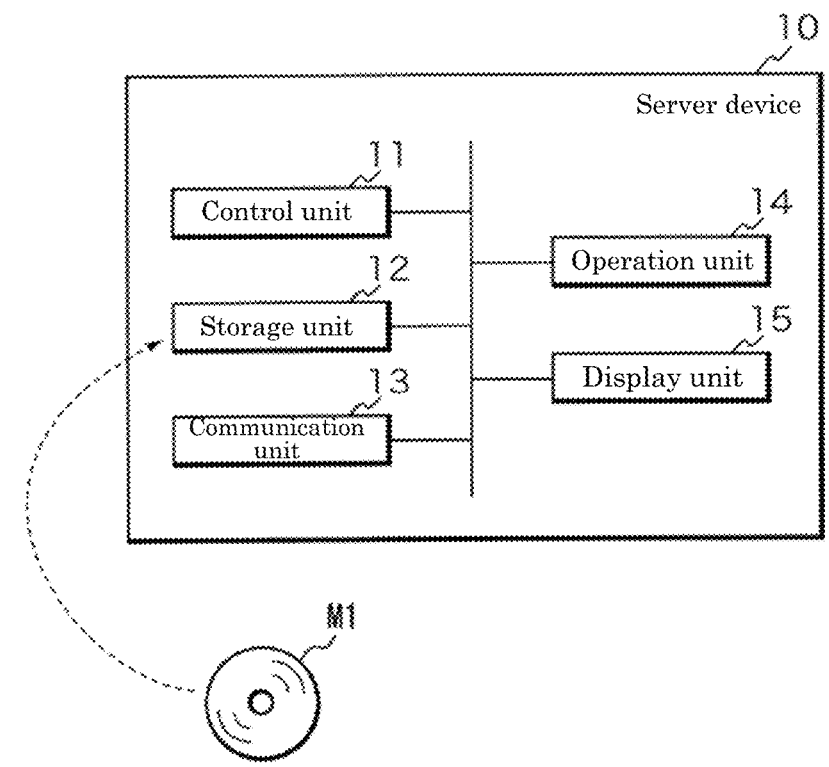
FIG. 2 is a block diagram explaining an internal configuration of a server device.

FIG. 2 is a block diagram explaining an internal configuration of the server device 10. The server device 10 includes a control unit 11, a storage unit 12, a communication unit 13, an operation unit 14, and a display unit 15.

The control unit 11 is composed of a central processing unit (CPU), a read only memory (ROM), a random access memory (RAM), and the like. The CPU included in the control unit 11 loads various computer programs stored in the ROM or the storage unit 12 into the RAM to execute the computer programs, so as to cause the entire device to function as the development support device. The server device 10 is merely one embodiment of the development support device that is only required to be any information processing device communicably connected to the client device 20.

The control unit 11 is not limited to the above configuration, and may be an arbitrary processing circuit or arithmetic circuit including a plurality of CPUs, a multi-core CPU, a graphics processing unit (GPU), a microcomputer, a volatile or non-volatile memory, and the like. Further, the control unit 11 may also include a function of a timer that measures the elapsed time from provision of a measurement start instruction to provision of a measurement end instruction, a counter that counts the number, a clock that outputs the date and time information, and the like.

The storage unit 12 includes a storage device that uses a hard disk drive (HDD), a solid state drive (SSD), or the like. The storage unit 12 stores various computer programs executed by the control unit 11, data necessary for executing the computer programs, and the like. The computer programs stored in the storage unit 12 include a simulation program that simulates the behavior of the power storage device. The simulation program is, for example, an execution binary. A theoretical formula that is the basis of the simulation program is described by an algebraic equation or a differential equation that expresses the behavior of the power storage device. The algebraic equation or differential equation may include the environmental temperature of the power storage device as a parameter. The simulation program may be prepared for each piece of behavior of a simulation target, or may be prepared as one computer program.

The program stored in the storage unit 12 may be provided by a non-temporary recording medium M1 in which the program is readably recorded. The recording medium M1 is, for example, a portable memory such as a CD-ROM, a universal serial bus (USB) memory, a secure digital (SD) card, a micro SD card, and a compact flash (registered trademark). In this case, the control unit 11 reads a program from the recording medium M1 using a reading device (not shown), and installs the read program in the storage unit 12. Further, the program stored in the storage unit 12 may be provided by communication via the communication unit 13. In this case, the control unit 11 acquires the program through the communication unit 13, and installs the acquired program in the storage unit 12.

Further, the storage unit 12 may store a mathematical model obtained as a result of the simulation. The mathematical model is, for example, an execution code executed by a programming language or numerical analysis software. Further, the mathematical model may also be definition information or a library file referred to by a programming language or numerical analysis software.

Furthermore, the storage unit 12 may also include a battery table that stores information of the power storage device (battery) in association with a user ID. FIG. 3 is a conceptual diagram showing an example of the battery table. The battery table stores, for example, a battery ID that identifies a battery, a user ID that identifies a user, and battery information in association with each other. The battery information registered in the battery table includes, for example, information on a positive electrode and a negative electrode, information of an electrolyte solution, information of a tab, and the like. The information on a positive electrode and a negative electrode is information on an active material name, thickness, width, depth, open circuit potential, and the like of the positive electrode and the negative electrode. The information on an electrolyte solution and a tab is information on ion species, transport number, diffusion coefficient, conductivity, and the like. Further, the battery table may include a link for referring to information on physical properties, an operating state, a circuit configuration, and the like of the power storage device. The information stored in the battery table may be registered by the administrator of the server device 10 or may be registered by the user via the client device 20. The information stored in the battery table may be used as part of a simulation condition when the behavior of the power storage device is simulated.

The communication unit 13 includes an interface for communicating with the client device 20 through the communication network N. In a case where the information to be transmitted to the client device 20 is input from the control unit 11, the communication unit 13 transmits the input information to the client device 20 and outputs the information from the client device 20 that is received through the communication network N to the control unit 11.

The operation unit 14 includes an input interface such as a keyboard and a mouse, and receives operation by the user. The display unit 15 includes a liquid crystal display device and the like, and displays information to be notified to the user. In the present embodiment, the server device 10 is configured to include the operation unit 14 and the display unit 15. However, the operation unit 14 and the display unit 15 are not essential. The configuration may be such that operation is received through a computer connected to the outside of the server device 10 and the information to be notified is output to the outside computer.

Figure 4:
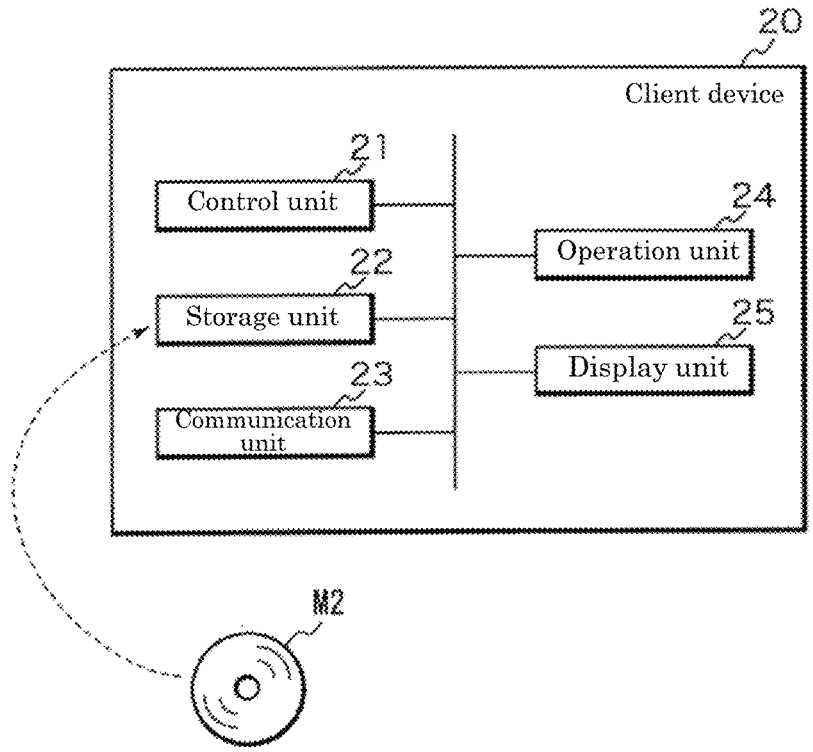
FIG. 4 is a block diagram explaining an internal configuration of a client device.

FIG. 4 is a block diagram explaining an internal configuration of the client device 20. The client device 20 is a personal computer, a smartphone, a tablet terminal, or the like, and includes a control unit 21, a storage unit 22, a communication unit 23, an operation unit 24, and a display unit 25.

The control unit 21 is composed of a CPU, a ROM, a RAM, and the like. The CPU included in the control unit 21 loads various computer programs stored in the ROM or the storage unit 22 into the RAM to execute the computer programs, so as to cause the entire device to function as the terminal device.

The control unit 21 is not limited to the above configuration, and may be an optional processing circuit or arithmetic circuit including a plurality of CPUs, a multi-core CPU, a microcomputer, and the like. Further, the control unit 21 may also include a function of a timer that measures the elapsed time from provision of a measurement start instruction to provision of a measurement end instruction, a counter that counts the number, a clock that outputs the date and time information, and the like.

The storage unit 22 is composed of a non-volatile memory such as an electronically erasable programmable read only memory (EEPROM), and stores various computer programs and data. The computer program stored in the storage unit 22 includes a general-purpose or dedicated application used for exchanging information with the server device 10. An example of the general-purpose application program is a web browser. In a case of accessing the server device 10 using a web browser, user authentication using a user ID and an authentication code is preferably performed, and it is only required that communication between the server device 10 and the client device 20 is permitted only in a case where the user authentication is successful.

The program stored in the storage unit 22 may be provided by a non-temporary recording medium M2 in which the program is readably recorded. The recording medium M2 is, for example, a portable memory such as a CD-ROM, a USB memory, an SD card, a micro SD card, and a compact flash (registered trademark). In this case, the control unit 21 reads a program from the recording medium M2 using a reading device (not shown), and installs the read program in the storage unit 22. Further, the program stored in the storage unit 22 may be provided by communication via the communication unit 23. In this case, the control unit 21 acquires various programs through the communication unit 23, and installs the acquired various programs in the storage unit 22.

The communication unit 23 includes an interface for communicating with the server device 10 through the communication network N. In a case where the information to be transmitted to the server device 10 is input from the control unit 21, the communication unit 23 transmits the input information to the server device 10 and outputs the information from the server device 10 that is received through the communication network N to the control unit 21.

The operation unit 24 includes an input interface such as a keyboard, a mouse, and a touch panel, and receives operation by the user. The display unit 25 includes a liquid crystal display device and the like, and displays information to be notified to the user. In the present embodiment, the client device 20 is configured to include the operation unit 24. However, the client device 20 may be configured to be connected to an input interface such as a keyboard or a mouse.

Hereinafter, the operation of the simulation system according to the present embodiment will be described with reference to a screen displayed on the display unit 25 of the client device 20.

Figure 5:
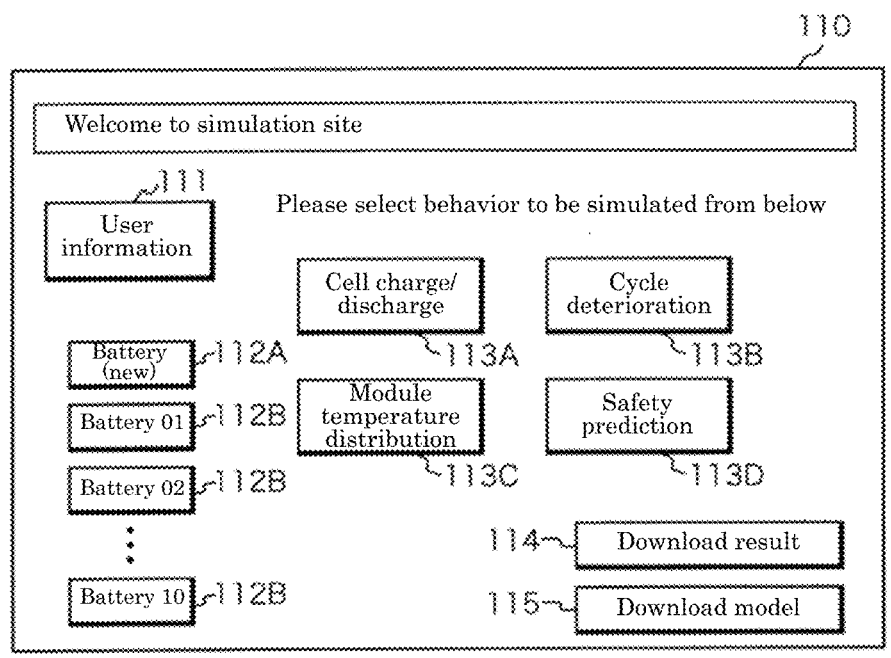
FIG. 5 is a schematic diagram illustrating an example of a selection screen for selecting the behavior to be simulated.

FIG. 5 is a schematic diagram illustrating an example of a selection screen 110 for selecting the behavior to be simulated. The selection screen 110 shown in FIG. 5 shows an example of a screen displayed on the display unit 25 of the client device 20 after the client device 20 accesses the server device 10 and is authenticated as an authorized user. The client device 20 communicates with the server device 10 and acquires data for the display screen from the server device 10, so that the selection screen 110 as shown in FIG. 5 can be displayed on the display unit 25.

The selection screen 110 is a screen including various display fields and operation buttons disposed as components of a user interface (UI), and receives operation by the user through the operation unit 24.

A display field 111 is a display field for displaying user information such as a user ID and previous access date and time. The client device 20 communicates with the server device 10 and acquires the user information such as a user ID and previous access date and time from the server device 10, so as to be able to display the user information in the display field 111.

A registration button 112A is an operation button for registering information on a new power storage device (battery information) in the server device 10. In a case where the registration button 112A is operated by using the operation unit 24, the client device 20 causes the display unit 25 to display a receiving screen for receiving battery information. When receiving of the battery information is completed, the client device 20 transmits the received battery information to the server device 10. The server device 10 registers the battery information received from the client device 20 in the battery table of the storage unit 12.

Selection buttons 112B, 112B, . . . , 112B are operation buttons for selecting a power storage device. When any of the selection buttons 112B is operated using the operation unit 24, the client device 20 acquires detailed information of the selected power storage device from the server device 10, and causes the display unit 25 to display the acquired detailed information.

Selection buttons 113A to 113D are operation buttons for selecting the behavior to be simulated. The selection button 113A is labeled "cell charge/discharge". That is, the selection button 113A indicates that the behavior to be simulated when selected using the operation unit 24 is "cell charge/discharge". The above applies in the same way to the other selection buttons 113B to 113D. Pieces of behavior to be simulated in a case where the selection buttons 113B to 113D are selected by using the operation unit 24 are shown to be "cycle deterioration", "module temperature distribution", and "safety prediction", respectively.

A download button 114 is an operation button operated when a simulation result is downloaded from the server device 10. The simulation result that can be downloaded in a case where the download button 114 is operated is data such as numerical data and a graph obtained as an execution result when the server device 10 executes the simulation for the behavior selected by the selection buttons 113A to 113D. In a case where the download button 114 is operated by using the operation unit 24, the client device 20 requests the server device 10 to transmit the simulation result through the communication unit 23, and receives the simulation result transmitted from the server device 10 as a response to the request.

A download button 115 is an operation button operated when a mathematical model is downloaded from the server device 10. Here, the mathematical model represents a model in which the characteristics of a power storage device are mathematically described using an algebraic equation, a differential equation, and a characteristic parameter, and is a model obtained by executing a simulation. In the present embodiment, the mathematical model is provided in the format of a library, a module, and the like used in numerical analysis software, such as MATLAB (registered trademark), ANSYS (registered trademark), Amesim (registered trademark), and Modelica (registered trademark), or a programming language. In a case where the download button 115 is operated by using the operation unit 24, the client device 20 transmits a transmission request for the mathematical model for the behavior selected by the selection buttons 113A to 113D to the server device 10, and receives the mathematical model transmitted from the server device 10 as a response to the request.

In a case where the download button 115 is operated, the server device 10 may be configured to derive only the mathematical model and provide the mathematical model to the user without calculating numerical data or the like as the simulation result.

After receiving the selection for the behavior to be simulated on the selection screen 110 described above, the client device 20 displays the receiving screen for receiving the simulation condition on the display unit 25.

Figure 6:
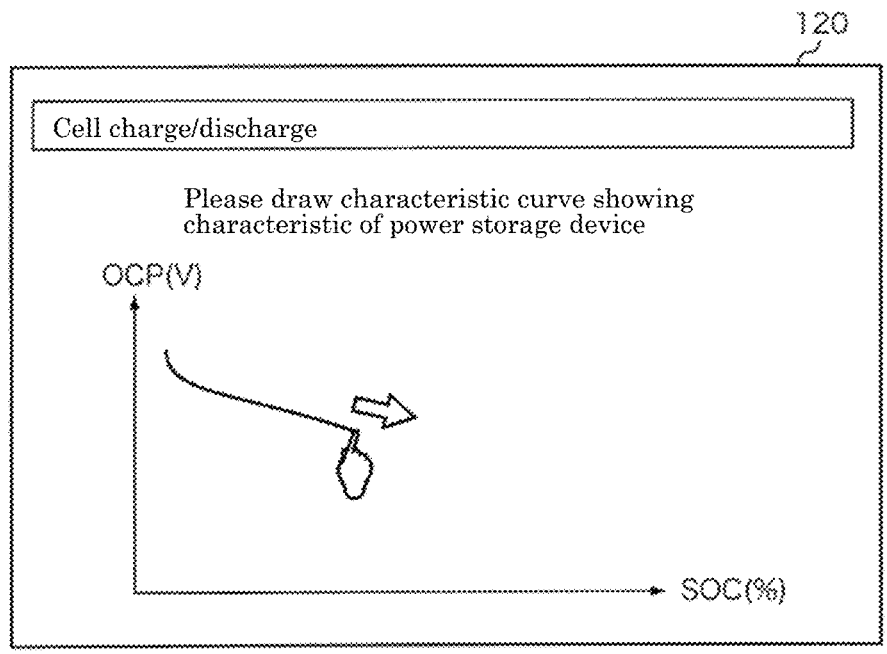
FIG. 6 is a schematic diagram illustrating an example of a receiving screen that receives a simulation condition.

FIG. 6 is a schematic diagram illustrating an example of the receiving screen that receives a simulation condition. A receiving screen 120 shown in FIG. 6 is an example of a screen displayed on the display unit 25 in a case where the selection button 113A is operated on the selection screen 110 described above and the behavior related to "cell charge/discharge" is selected as the behavior to be simulated. The receiving screen 120 receives drawing of a characteristic curve showing the physical properties of a power storage device. A mouse or a touch panel included in the operation unit 24 is used for drawing the characteristic curve. The characteristic curve for which drawing is received on the receiving screen 120 is optional. For example, characteristic curves, such as a charge-discharge curve showing a relationship between the charge-discharge capacity and a battery voltage, an SOC-OCP curve showing a relationship between a state of charge (SOC) and an open circuit potential (OCP), an SOC-OCV curve showing a relationship between SOC and an open circuit voltage (OCV), can be received. In the example shown in FIG. 6, a state in which the drawing of the characteristic curve (SOC-OCP curve) is received in a graph with the horizontal axis as SOC and the vertical axis as OCP.

The control unit 21 of the client device 20 appropriately reads numerical values on the curve (values of SOC and OCP in the example of FIG. 6) from the characteristic curve drawn on the receiving screen 120, and stores the read values in the storage unit 22. The control unit 21 transmits the value read from the characteristic curve to the server device 10 as a simulation condition. Further, the control unit 21 may display the numerical value read from the characteristic curve on the receiving screen 120 in a table format and receive a change in the numerical value read from the characteristic curve. The keyboard included in the operation unit 24 is used to change the numerical value.

When receiving a simulation condition, the user has conventionally been required to directly input a numerical value group corresponding to the characteristic curve from the keyboard, which has been a complicated task. In contrast, in the present embodiment, since the numerical input is completed by receiving the drawing of the characteristic curve on the receiving screen 120, many input values can be easily given. As a matter of course, numerical value input via the operation unit 24 that has been conventionally performed and reading of an external file may also be supported.

Figure 7:
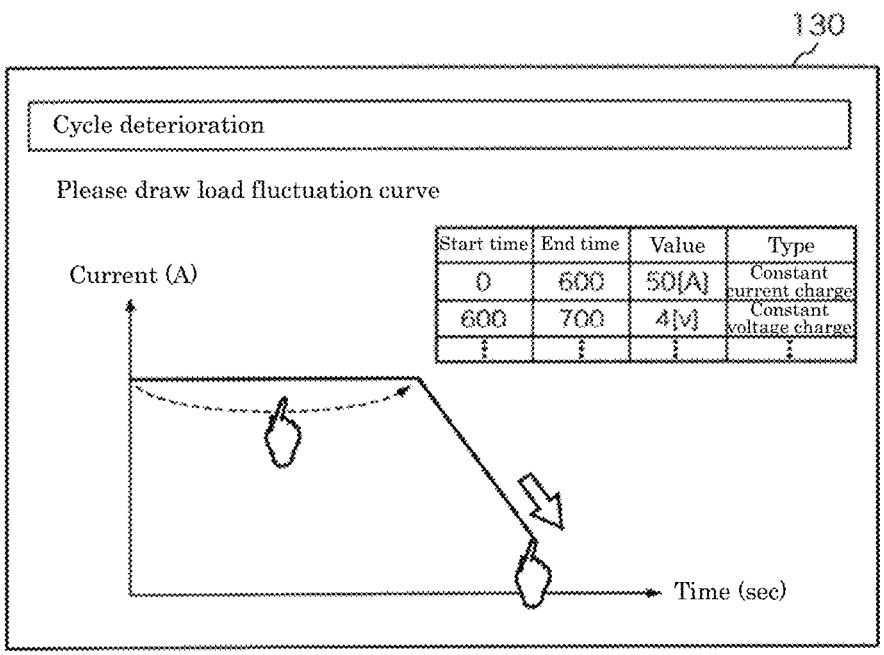
FIG. 7 is a schematic diagram illustrating another example of the receiving screen that receives a simulation condition.

FIG. 7 is a schematic diagram illustrating another example of the receiving screen that receives a simulation condition. A receiving screen 130 shown in FIG. 7 is an example of a screen displayed on the display unit 25 in a case where the selection button 113B is operated on the selection screen 110 described above and the behavior related to "cycle deterioration" is selected as the behavior to be simulated. The receiving screen 130 receives drawing of a load fluctuation curve showing a change over time in an operating state of a power storage device, more specifically, a change over time in charge-discharge current or voltage of the power storage device. A mouse or a touch panel included in the operation unit 24 is used to draw the load fluctuation curve. In the example shown in FIG. 7, a state in which the drawing of the load fluctuation curve is received in a graph with the horizontal axis as time and the vertical axis as charge-discharge current. In this graph, in a case where a straight line substantially parallel to the time axis is drawn, the behavior is set as charge-discharge of constant current, and in a case where a straight line diagonal to the time axis is drawn, the behavior is set as charge-discharge of constant voltage. A curve drawn above the time axis is recognized as discharge operation, and a curve drawn below the time axis is recognized as charge operation.

The control unit 21 of the client device 20 appropriately reads numerical values on the curve (values of time and charge-discharge current in the example of FIG. 7) from the load fluctuation curve drawn on the receiving screen 130, and stores the read values in the storage unit 22. The control unit 21 transmits the value read from the load fluctuation curve to the server device 10 as a simulation condition. Further, the control unit 21 may display the numerical value read from the load fluctuation curve on the receiving screen 130 in a table format and receive a change in the numerical value read from the load fluctuation curve. The keyboard included in the operation unit 24 is used to change the numerical value.

Figure 8:
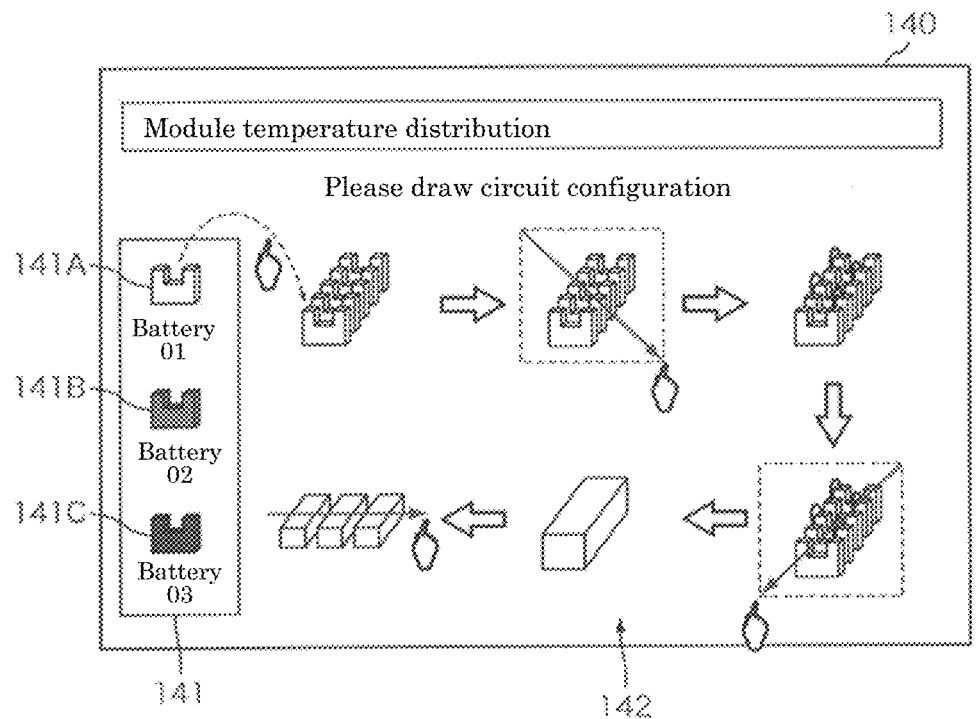
FIG. 8 is a schematic diagram illustrating another example of the receiving screen that receives a simulation condition.

FIG. 8 is a schematic diagram illustrating another example of the receiving screen that receives a simulation condition. A receiving screen 140 shown in FIG. 8 is an example of a screen displayed on the display unit 25 in a case where the selection button 113C is operated on the selection screen 110 described above and the behavior related to "module temperature distribution" is selected as the behavior to be simulated. The receiving screen 140 receives drawing of a circuit configuration necessary for simulating the temperature distribution of a power storage device. The receiving screen 140 has a display field 141 for displaying a plurality of types of batteries (cells) that can be incorporated into the power storage device, and a drawing area 142 for receiving drawing of a circuit configuration of the power storage device.

In the display field 141, icons 141A to 141C corresponding to three types of batteries are shown. The number of batteries displayed in the display field 141 is not limited to three, and a wider variety of batteries may be displayed. Further, in a case where predetermined operation such as double click is received for the icon 141A (141B, 141C), detailed information of the corresponding battery may be displayed. Furthermore, editing of the displayed detailed information may be received.

In a case where a battery corresponding to the icon 141A is incorporated into the power storage device, the receiving screen 140 receives operation of moving the icon 141A from the display field 141 into the drawing area 142 and disposing the icon 141A in the drawing area 142. An example of the operation for moving and disposing the icon 141A is drag operation. The above applies in the same way to a case where batteries corresponding to the icons 141B and 141C are incorporated into the power storage device. The example of FIG. 8 shows a state where five batteries corresponding to the icon 141A are disposed, in which the number of disposed batteries is optional, and a plurality of types of batteries may be disposed in a mixed manner.

The receiving screen 140 may receive operation of copying the battery disposed in the drawing area 142. An example of the copying operation is operation of dragging a target icon (the icons 141A to 141C) while pressing a specific key.

The receiving screen 140 can receive operation of connecting a plurality of batteries disposed in the drawing area 142. An example of the operation of connecting a plurality of batteries is operation of enclosing batteries to be connected. The example of FIG. 8 shows a state in which the five batteries disposed in the drawing area 142 are connected in series by the operation enclosing the five batteries. The configuration may be such that two types of operation relating to connection are prepared, one operation is used to connect the batteries in series, and the other operation is used to connect the batteries in parallel. For example, if the enclosing operation from the upper left to the lower right is performed with the mouse, the batteries may be connected in series, and if the enclosing operation from the upper right to the lower left is performed with the mouse, the batteries may be connected in parallel.

The receiving screen 140 can receive operation of grouping the connected batteries. An example of the operation of grouping is operation of enclosing the connected batteries. The example of FIG. 8 shows a state in which a circuit configuration is changed into one in which the five connected batteries are grouped (that is, a module) by the operation of enclosing the batteries.

The receiving screen 140 may receive operation of copying the module drawn in the drawing area 142. An example of the copying operation is operation of dragging the drawn module while pressing a specific key. FIG. 8 shows a state in which one module is copied twice and a total of three modules are disposed.

The example of FIG. 8 shows the process of configuring a plurality of modules from batteries (cells). However, the above applies in the same way to a process of configuring a bank from modules, and a process of configuring a domain from banks. In the example of FIG. 8, for convenience, the state in which a plurality of batteries are disposed, the state before the connection, the state after the connection, the state in which a module is configured by grouping, and the state in which a plurality of modules are disposed are described side by side. However, on the actual receiving screen 140, it is not necessary to display these side by side, and it is only required to display only the state after operation while switching the screen according to each operation.

Figure 9:
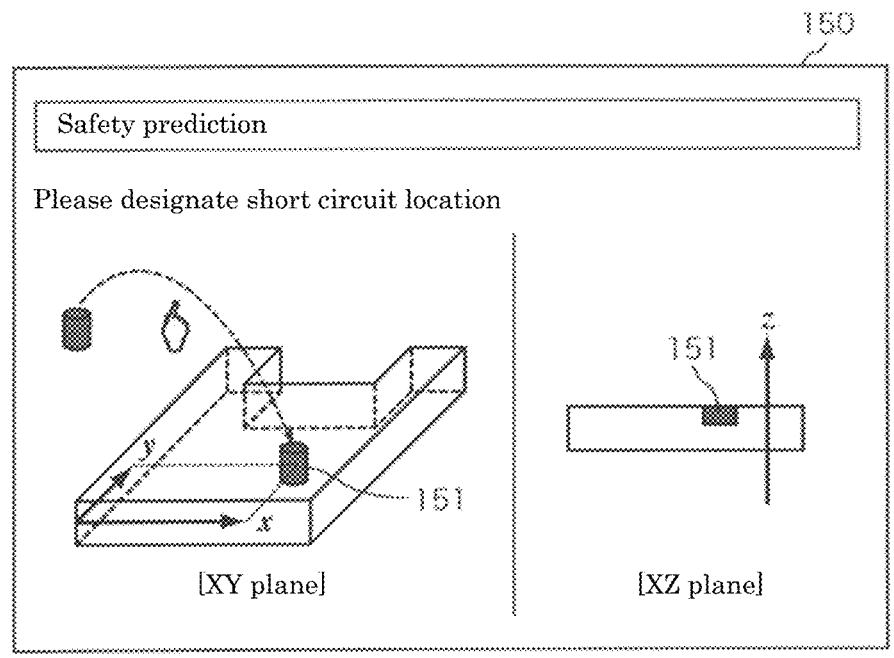
FIG. 9 is a schematic diagram illustrating another example of the receiving screen that receives a simulation condition.

FIG. 9 is a schematic diagram illustrating another example of the receiving screen that receives a simulation condition. A receiving screen 150 shown in FIG. 9 is an example of a screen displayed on the display unit 25 in a case where the selection button 113D is operated on the selection screen 110 described above and the behavior related to "safety prediction" is selected as the behavior to be simulated. The receiving screen 150 receives drawing of a circuit configuration necessary for simulating the safety of a power storage device. The receiving screen 150 shown in FIG. 9 receives the designation of a short circuit location in a single energy storage device (cell). Specifically, the designation of the short circuit location is received as operation of moving and disposing a columnar icon 151 for designating the short circuit location into the energy storage device is received. An example of the operation for moving and disposing the icon 151 is drag operation. The receiving screen 150 may receive the designation of the short circuit location in one surface of the energy storage device, and may further receive the designation of the short circuit location in a direction intersecting the surface.

Hereinafter, the operation of the server device 10 and the client device 20 will be described.

Figure 10:
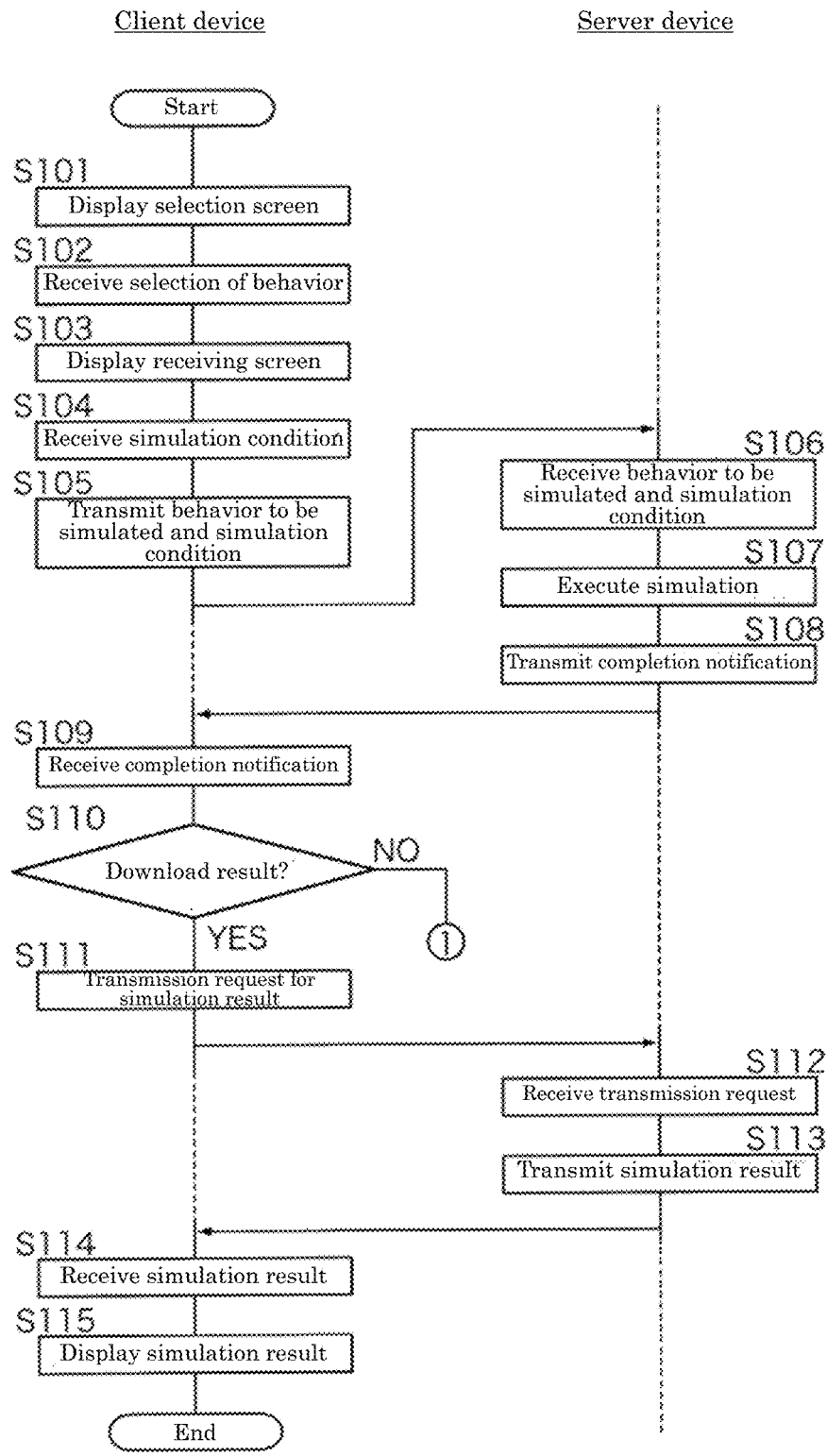
FIG. 10 is a flowchart explaining a process of processing executed by the server device and the client device.
Figure 11:
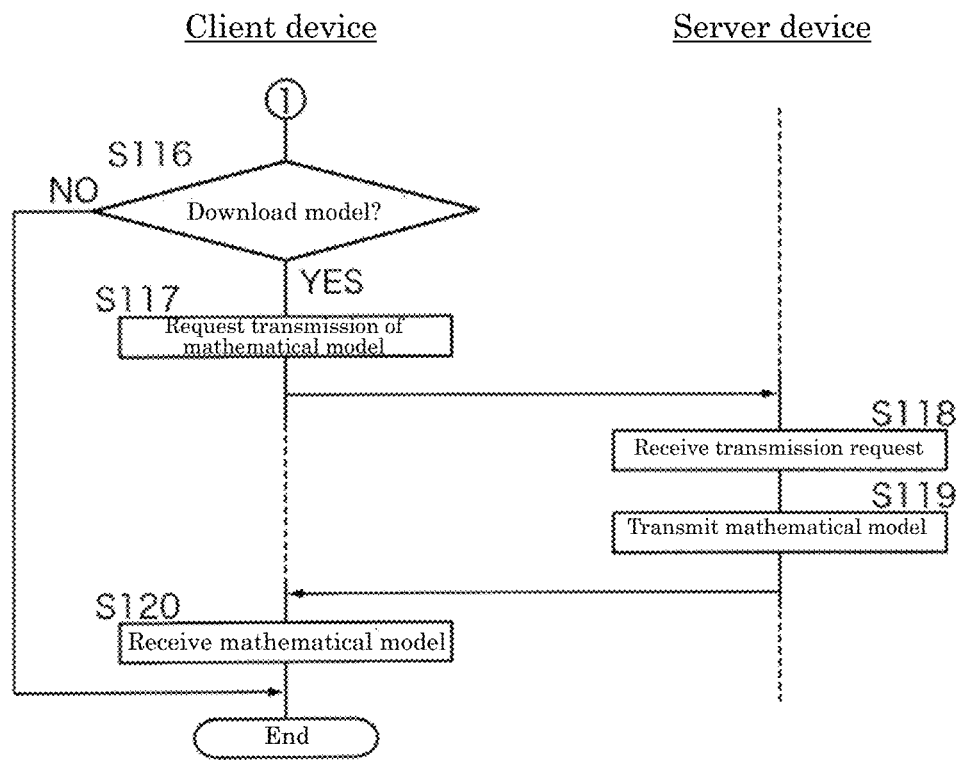
FIG. 11 is a flowchart explaining a process of processing executed by the server device and the client device.

FIGS. 10 and 11 are a flowchart explaining a process of the processing executed by the server device 10 and the client device 20. The control unit 21 of the client device 20 receives data for the display screen transmitted from the server device 10 after the user authentication, and displays the selection screen 110 for selecting the behavior to be simulated on the display unit 25 (Step S101). The control unit 21 receives selection regarding the behavior to be simulated through the selection screen 110 displayed on the display unit 25 (Step S102).

Further, the control unit 21 displays the receiving screen 120 (130 to 150) for receiving a simulation condition necessary for simulating the selected behavior on the display unit 25 (Step S103). The control unit 21 receives a simulation condition through the receiving screen 120 (130 to 150) displayed on the display unit 25 (Step S104). As described above, the simulation conditions include the physical properties, the operating state, the circuit configuration, and the like of the power storage device. Further, the control unit 21 may store the received simulation condition in the storage unit 22 so that the simulation condition can be read out when the simulation is re-executed under the same simulation condition. When receiving the simulation condition in Step S106, the control unit 21 may prompt the user to input the environmental temperature of the power storage device.

The control unit 21 transmits information on the behavior to be simulated selected in Step S102 and information on the simulation condition received in Step S104 to the server device 10 through the communication unit 23 (Step S105).

The server device 10 receives the information on the behavior to be simulated and the information on the simulation condition transmitted from the client device 20 by the communication unit 13 (Step S106). The control unit 11 of the server device 10 executes the simulation based on the information of the behavior to be simulated and the information on the simulation condition received through the communication unit 13 (Step S107). At this time, the control unit 11 simulates the behavior of the power storage device by selecting a simulation program corresponding to the behavior to be simulated and applying the simulation condition to the selected simulation program. In a case where the simulation condition includes the environmental temperature of the power storage device, it is only required that the control unit 11 simulate the behavior of the power storage device in consideration of the environmental temperature. Further, the control unit 11 may also store the simulation condition received in Step S106 in the storage unit 12 in association with the user ID input at the time of user authentication. In a case where the simulation is completed, the control unit 11 transmits a notification showing that the simulation is completed to the client device 20 through the communication unit 13 (Step S108).

In a case of receiving the notification showing that the simulation is completed (Step S109), the client device 20 can request the server device 10 to transmit a simulation result (data such as numerical data and a graph, or a mathematical model obtained as a result of the simulation). The control unit 21 of the client device 20 determines whether or not a request for downloading a result is received (Step S110). For example, in a case where the download button 114 is operated on the selection screen 110 shown in FIG. 5, the control unit 21 determines that the request for downloading a result is received. In a case where the request for downloading a result is received (S110: YES), the control unit 21 transmits a transmission request for data such as numerical data and a graph obtained as a simulation result from the communication unit 23 to the server device 10 (Step S111).

In a case of receiving the transmission request from the client device 20 (Step S112), the server device 10 transmits a simulation result obtained by executing the simulation in Step S107 to the client device 20 (Step S113). The simulation result transmitted in Step S113 may be numerical data, or may be a graph, a contour diagram, moving images, or the like generated from the numerical data.

Figure 12:
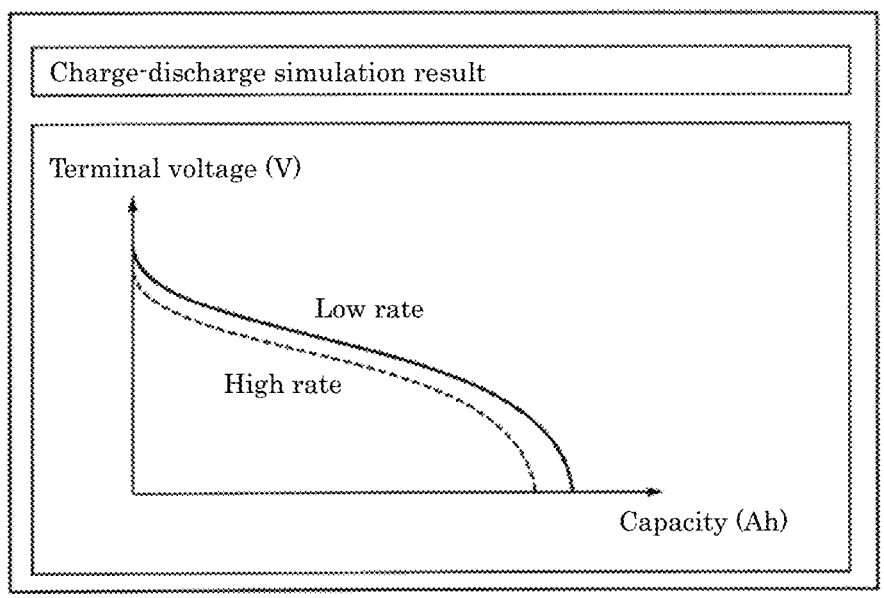
FIG. 12 is a schematic diagram illustrating a display example of a simulation result.

The client device 20 receives the simulation result transmitted from the server device 10 by the communication unit 23 (Step S114). The control unit 21 of the client device 20 displays the received simulation result on the display unit 25 (Step S115). FIG. 12 is a schematic diagram illustrating a display example of the simulation result. FIG. 12 is an example of the execution result of the simulation relating to the charge-discharge characteristics of the power storage device, and is represented by, for example, a graph in which the horizontal axis represents capacity (Ah) and the vertical axis represents terminal voltage (V). In the example of FIG. 12, the execution result of the simulation relating to the charge-discharge characteristics of the power storage device is described. However, the above applies in the same way to the case of displaying a simulation result regarding the cycle deterioration, the module temperature distribution, and the safety prediction. That is, for the cycle deterioration, for example, the simulation result can be displayed by a graph in which the horizontal axis represents the number of charge cycles and the vertical axis represents capacity. Further, for the module temperature distribution, for example, the simulation result can be displayed by a graph showing the temperature change for each cell in which the horizontal axis represents time and the vertical axis represents temperature. Furthermore, for the safety prediction, the simulation result can be displayed by a graph in which the horizontal axis represents time and the vertical axis represents heat generation density. The simulation result is not limited to the provision by the graph as shown in FIG. 12, and may be provided by numerical data, contour diagram, moving images, or the like.

In a case where it is determined in Step S110 that the request for downloading a result is not received (S110: NO), the control unit 21 determines whether or not the transmission request for a mathematical model is received (Step S116). For example, in a case where the download button 115 is operated on the selection screen 110 shown in FIG. 5, the control unit 21 determines that the transmission request for a mathematical model is received.

Figure 13:
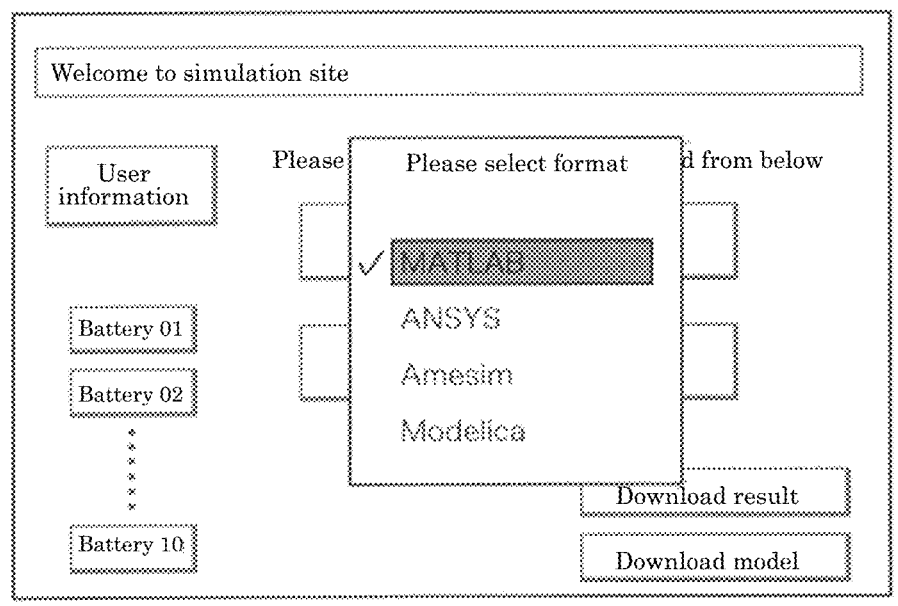
FIG. 13 is a schematic diagram illustrating an example of a selection screen for selecting a format of a mathematical model.

When receiving the transmission request for a mathematical model, the control unit 21 may receive designation regarding the format of a mathematical model to be downloaded. FIG. 13 is a schematic diagram illustrating an example of a selection screen for selecting a format of a mathematical model. FIG. 13 shows, for example, an example of a screen to be displayed in a case where the download button 115 is pressed on the selection screen 110 of FIG. 5. In the example of FIG. 13, it is shown that the formats of MATLAB (registered trademark), ANSYS (registered trademark), Amesim (registered trademark), and Modelica (registered trademark) can be selected as the file format of a mathematical model.

In a case of receiving the transmission request for a mathematical model (S116: YES), the control unit 21 transmits the transmission request for a mathematical model from the communication unit 23 to the server device 10 (Step S117). In a case of not receiving the transmission request for a mathematical model (S116: NO), the control unit 21 ends the processing by the present flowchart.

In a case of receiving the transmission request for a mathematical model from the client device 20 (Step S118), the server device 10 transmits a mathematical model obtained as a result of the simulation in Step S107 to the client device 20 (Step S119). In a case where the format of the mathematical model is designated in the client device 20, the control unit 11 transmits the mathematical model in the designated format to the client device 20.

Figure 14:
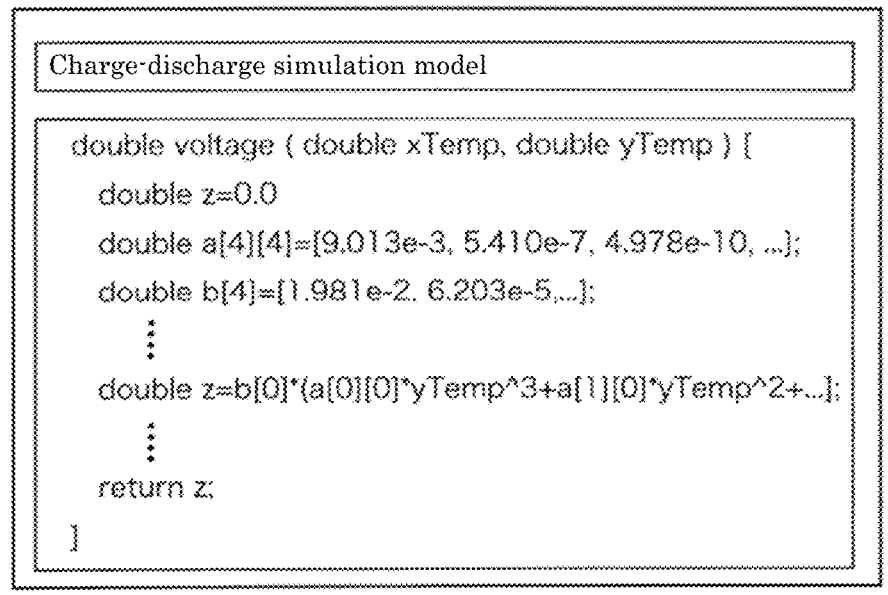
FIG. 14 is a schematic diagram illustrating an example of a mathematical model received from the server device.

The client device 20 receives the mathematical model transmitted from the server device 10 by the communication unit 23 (Step S120). FIG. 14 is a schematic diagram illustrating an example of the mathematical model received from the server device 10. The control unit 21 stores the received mathematical model in the storage unit 22. The mathematical model stored in the storage unit 22 can be used in numerical analysis software or a programming language corresponding to the mathematical model, and the simulation can be executed by the client device 20 as the simulation condition is provided.

As described above, in the present embodiment, the behavior of the power storage device can be simulated under the condition desired by the user, and the simulation result can be provided to the user. Further, as needed, a mathematical model obtained as a result of simulating the behavior of the power storage device can be provided to the user. Therefore, the client device 20 can acquire a simulation result of the power storage device or a system including the power storage device under a desired condition by using the mathematical model downloaded from the server device 10.

The server device 10 according to the present embodiment has a configuration that simulates "cell charge/discharge", "cycle deterioration", "module temperature distribution", and "safety prediction" as the behavior of a power storage device. However, the behavior to be simulated is not limited to the above pieces of behavior, and it is only required to simulate a dynamic change or a time-series change of a power storage device during charging and discharging.

In addition to the above embodiments, the present invention also includes aspects described below.

A recording medium according to an aspect is a computer-readable recording medium recording a computer program for causing a computer to execute processing of receiving a simulation condition of a power storage device from a terminal device after user authentication of the terminal device, simulating behavior of the power storage device based on the received simulation condition, and transmitting a simulation result to the terminal device.

A recording medium according to an aspect is a computer-readable recording medium recording a computer program for causing a computer to execute processing of presenting a plurality of simulation options and receiving a simulation condition of a power storage device for a selected simulation option from a terminal device, simulating behavior of the power storage device based on the received simulation condition, and transmitting a simulation result to the terminal device.

A recording medium according to an aspect is a computer-readable recording medium recording a computer program for causing a computer communicably connected to a development support device that simulates behavior of a power storage device to execute processing of displaying a receiving screen that receives a simulation condition and receiving a simulation condition on a displayed receiving screen, transmitting the simulation condition received on the receiving screen to the development support device, receiving a simulation result of the behavior based on the simulation condition from the development support device, and displaying the received simulation result on a display screen.

A recording medium according to an aspect is a computer-readable recording medium recording a computer program for causing a computer to execute processing of receiving, on a receiving screen, drawing of a characteristic curve showing physical property of a power storage device or a load fluctuation curve showing a change over time of an operating state of the power storage device, and reading a numerical value from the characteristic curve or the load fluctuation curve drawn on the receiving screen to acquire information related to the physical property or the operating state.

A computer program according to an aspect is a computer program for causing a computer communicably connected to a development support device that simulates behavior of a power storage device to execute processing of displaying a receiving screen that receives a simulation condition and receiving a simulation condition on a displayed receiving screen, transmitting the simulation condition received on the receiving screen to the development support device, receiving a simulation result of the behavior based on the simulation condition from the development support device, and displaying the received simulation result on a display screen.

The simulation condition may include at least one of a circuit configuration, physical property, and an operating state of the power storage device.

A computer program may cause a computer to execute processing of receiving drawing of the circuit configuration on the receiving screen and acquiring information related to a circuit configuration of the power storage device from the circuit configuration drawn on the receiving screen.

A computer program may cause a computer to execute processing of receiving, on the receiving screen, drawing regarding the arrangement of energy storage devices constituting the power storage device and a connection relationship between the energy storage devices.

A computer program may cause the computer to execute processing of receiving, on the receiving screen, designation of a short circuit location in the power storage device.

A computer program may cause the computer to execute processing of receiving, on the receiving screen, drawing of a characteristic curve showing physical property of the power storage device or a load fluctuation curve showing a change over time of an operating state of the power storage device, and reading a numerical value from the characteristic curve or the load fluctuation curve drawn on the receiving screen to acquire information related to the physical property or the operating state.

A computer program may cause the computer to execute processing of storing the received simulation condition in a storage device and reading a simulation condition to be transmitted to the development support device from the storage device.

Behavior of the power storage device simulated by the development support device may include a change in terminal voltage accompanied by charge and discharge of the power storage device, a change in capacity accompanied by charge and discharge of the power storage device, a change over time in capacity of the power storage device, or temperature distribution in the power storage device.

The simulation result may include numerical data obtained by numerical analysis based on a simulation program corresponding to the behavior to be simulated.

The simulation result may include a mathematical model obtained as a result of the simulation of the behavior.

A computer program may cause the computer to execute processing of receiving designation of a format for a mathematical model to be received and requesting the development support device to transmit a mathematical model of the designated format.

A computer program according to an aspect causes a computer to execute processing of receiving, on a receiving screen, drawing of a characteristic curve showing physical property of a power storage device or a load fluctuation curve showing a change over time of an operating state of the power storage device, and reading a numerical value from the characteristic curve or the load fluctuation curve drawn on the receiving screen to acquire information related to the physical property or the operating state.

The disclosed embodiments are exemplary in all respects and are not restrictive. The scope of the present invention is indicated by the claims and includes all changes within the meaning and scope equivalent to the claims.

DESCRIPTION OF REFERENCE SIGNS

10: Server device
11: Control unit
12: Storage unit
13: Communication unit
14: Operation unit
15: Display unit
20: Client device
21: Control unit
22: Storage unit
23: Communication unit
24: Operation unit
25: Display unit
N: Communication network

The invention claimed is:

1. An information processing device comprising:
a storage unit that stores a simulation program which is a computer program; and
a processor configured to:
transmit an interface screen to a terminal device, which is communicably connected to the information processing device via a communication network;
receive a simulation condition of a power storage device from the terminal device via the interface screen;
execute the simulation program stored in the storage unit based on the received simulation condition to simulate behavior of the power storage device; and transmit a simulation result of the simulated behavior to the terminal device via the communication network,
wherein the simulation condition received via the interface screen includes:
(1) a circuit configuration of the power storage device including a plurality of banks each in which a plurality of battery cells are connected with each other in series, the plurality of banks being connected with each other in parallel; and
(2) a numerical value indicated by a load fluctuation curve representing a change over time of an operating state of the power storage device, and
wherein the simulated behavior includes at least one of a change over time in capacity of the power storage device including the plurality of banks or a change in capacity accompanied by charge and discharge of the power storage device including the plurality of banks.

2. The information processing device according to claim 1, wherein the simulation result includes a mathematical model obtained as a result of the simulation, and the processor transmits the mathematical model to the terminal device via the communication network in a format designated by the terminal device.

3. The information processing device according to claim 2, wherein the mathematical model includes an execution code which is able to be executed by a programming language or numerical analysis software, or definition information or a library file which is able to be referred to by the programming language or the numerical analysis software.

4. The information processing device according to claim 1, wherein the behavior simulated by the processor further includes a change over time in charge-discharge current or voltage of the power storage device or a temperature distribution in the power storage device.

5. The information processing device according to claim 1, wherein the processor receives, from the terminal device, a simulation condition input by drawing the circuit configuration of the power storage device, and the load fluctuation curve.

6. The information processing device according to claim 1, wherein
the processor receives user identification information together with a simulation condition, and
the storage unit further stores the received simulation condition and user identification information in association with each other.

7. A terminal device comprising:
a display unit that displays an interface screen as a receiving screen that receives a simulation condition for simulating behavior of a power storage device; and
a processor configured to:
receive the interface screen from an information processing device that is communicably connected to the terminal device via a communication network;
receive a simulation condition of a power storage device through the interface screen;
transmit the received simulation condition to the information processing device that executes a simulation program which is a computer program stored in a storage unit included in the information processing device based on the received simulation condition to simulate the behavior; and
receive a simulation result of the behavior based on the simulation condition from the information processing device via the communication network,
wherein the received simulation result is displayed on the display unit, wherein the simulation condition received via the interface screen includes:
(1) a circuit configuration of the power storage device including a plurality of banks each in which a plurality of battery cells are connected with each other in series, the plurality of banks being connected with each other in parallel; and
(2) a numerical value indicated by a load fluctuation curve representing a change over time of an operating state of the power storage device,
wherein the simulated behavior includes at least one of a change over time in capacity of the power storage device including the plurality of banks or a change in capacity accompanied by charge and discharge of the power storage device including the plurality of banks, and
wherein the processor receives a simulation condition input by drawing the circuit configuration of the power storage device, and the load fluctuation curve.

8. A computer-implemented information processing method comprising:
transmitting, by a processor, an interface screen to a terminal device communicably connected to the processor via a communication network;
obtaining, by the processor, a simulation condition of a power storage device from the terminal device via the interface screen;
executing, by the processor, a simulation program which is a computer program stored in a storage unit based on the obtained simulation condition to simulate behavior of the power storage device; and
outputting, by the processor, a simulation result of the simulated behavior to the terminal device,
wherein the simulation condition received via the interface screen includes:
(1) a circuit configuration of the power storage device including a plurality of banks each in which a plurality of battery cells are connected with each other in series, the plurality of banks being connected with each other in parallel; and
(2) a numerical value indicated by a load fluctuation curve representing a change over time of an operating state of the power storage device, and
wherein the simulated behavior includes at least one of a change over time in capacity of the power storage device including the plurality of banks or a change in capacity accompanied by charge and discharge of the power storage device including the plurality of banks.

9. The information processing device according to claim 1, wherein
the behavior simulated by the processor includes a cycle deterioration, and
the processor causes the terminal device to display the transmitted simulation result by a graph in which a horizontal axis represents a number of charge cycles and a vertical axis represents a capacity.

10. The information processing device according to claim 1, wherein
the circuit configuration includes an arrangement of the plurality of battery cells, an arrangement of a plurality of modules each in which the plurality of battery cells are connected with each other in series, an arrangement of the plurality of banks each in which the plurality of modules are connected with each other in series, and an arrangement of a domain in which the plurality of banks are connected with each other in parallel.

11. The information processing device according to claim 1, wherein
the simulation program includes a plurality of sub-simulation programs, and
the processor is further configured to:
receive an information on the behavior to be simulated from the terminal device via the communication network;
select one of the plurality of sub-simulation programs corresponding to the behavior to be simulated; and
apply the received simulation condition to the selected sub-simulation program.

12. The information processing device according to claim 1, wherein
the interface screen for receiving the simulation condition includes:
(1) a first receiving screen including graphical user interface components for receiving drawing of the circuit configuration of the power storage device via an input from a mouse or a touch panel operated by a user, and
(2) a second receiving screen including graphical user interface components for receiving drawing of the load fluctuation curve via an input from the mouse or the touch panel operated by the user,
the first receiving screen is configured to receive at least one of:
an operation of moving an icon representing each one of the plurality of battery cells to dispose the icon in a drawing area;
an operation of dragging the icon while pressing a key to copy one of the plurality of battery cells;
an operation of enclosing the icons in the drawing area to connect the plurality of battery cells;
an operation of enclosing the connected battery cells to group the connected battery cells; or
an operation of moving and disposing an icon representing a short circuit in a graphic representing the energy storage device to designate a short circuit location,
the second receiving screen allows reading the numerical value on the load fluctuation curve,
the second receiving screen includes a time axis, and
the second receiving screen is configured to receive drawing of a line relative to the time axis to set the behavior to be simulated.

* * * * *